(12) United States Patent
Chen et al.

(10) Patent No.: US 10,990,818 B2
(45) Date of Patent: Apr. 27, 2021

(54) VIRTUAL REALITY DEVICE WITH IRIS ACQUISITION FUNCTION

(71) Applicant: AAC Technologies Pte. Ltd., Singapore (SG)

(72) Inventors: Yue Chen, Shenzhen (CN); Rongguan Zhou, Shenzhen (CN)

(73) Assignee: Raytech Optical (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 16/779,645

(22) Filed: Feb. 2, 2020

(65) Prior Publication Data

US 2020/0167563 A1    May 28, 2020

Related U.S. Application Data

(63) Continuation-in-part of application No. 15/416,883, filed on Jan. 26, 2017, now Pat. No. 10,706,280.

(30) Foreign Application Priority Data

Aug. 18, 2016    (CN) .......................... 201610687733.6

(51) Int. Cl.
*G06K 9/00* (2006.01)
*G06F 21/32* (2013.01)
*G02B 27/01* (2006.01)

(52) U.S. Cl.
CPC ..... *G06K 9/00617* (2013.01); *G02B 27/0176* (2013.01); *G06F 21/32* (2013.01)

(58) Field of Classification Search
CPC ........... G06K 9/00617; G06K 9/00604; G06K 9/2018; G06K 9/209; G06F 21/32; G02B 27/0176; G02B 2027/0187; G02B 27/0172; G02B 27/0093
See application file for complete search history.

(56) References Cited

U.S. PATENT DOCUMENTS

2002/0018136 A1*  2/2002  Kaji .................. H04N 5/232123
                                                            348/333.02
2017/0325675 A1* 11/2017  Liu ...................... A61B 3/0041

* cited by examiner

*Primary Examiner* — Boubacar Abdou Tchoussou
(74) *Attorney, Agent, or Firm* — W&G Law Group LLP

(57) ABSTRACT

A virtual reality device with iris acquisition function, includes a housing having an accommodating space, an observing lens embedded in the housing, a display screen accommodated in the housing and arranged opposite to the observing lens, and at least one iris camera accommodated in the housing. The virtual reality device further includes at least one infrared source accommodated in the housing, the infrared source is arranged on a focal plane of the observing lens and light emitted from the infrared source passes through the observing lens to an iris of a human eye. The iris camera is configured to acquire an iris image of a human eye through the observing lens and the iris camera is arranged at a position which will not interfere a line of sight of the human eye on the infrared source and the display screen.

11 Claims, 4 Drawing Sheets

VIRTUAL REALITY DEVICE WITH IRIS ACQUISITION FUNCTION

TECHNICAL FIELD

The present disclosure relates to the field of virtual reality technologies and, in particular, to a virtual reality device with iris acquisition function.

BACKGROUND

Virtual reality (Virtual Reality, VR) technique is a computer technique capable of creating and experiencing a virtual world, which can create a virtual environment using a computer, and belongs to a system simulation of three dimensional dynamic vision and entity behavior in a manner of interactive integration of multi-source information. User can enter into a virtual space to perceive and operate various objects in the virtual world in real time by means of professional equipment such as sensing helmet, data glove and the like, so as to obtain a highly immersive real experience through vision, touch, hearing and so on. Virtual reality technique is an important research aspect of simulation technique, which is an integration of a variety of techniques such as computer graphics, man-machine interface technique, multi-media technique, sensing technique, network technique and the like.

In recent years, virtual reality technique is developing rapidly, and virtual reality device such as VR glasses is widely popularized. The research aspect of the virtual reality device in the prior art mainly concerns the graphic and man-machine interaction etc, so that the user can obtain better immersive experience. However, since the virtual reality devices are widely applied, customers have more and more diversified and personalized demands, for example, demands on convenience of payment, safety of recognition when purchasing through the virtual reality device, on privacy of unlocking encryption when viewing video and the like.

Iris recognition technique is one of the human biological recognition techniques. Features such as high uniqueness, high stability and unchangeability of the iris are a physical foundation of the iris in identity authorization. Therefore, iris recognition is a most convenient and accurate biological recognition technique among all of the biological recognition techniques including fingerprint identification technique. Iris recognition technique is regarded as the biological recognition technique with most prospects in 21st century, which shall be deemed as a key technique in a variety of application fields such as security, national defense, e-commerce and the like. Such a trend appears to be obvious in various applications throughout the world with a wide application prospect.

In view of the above, the present research combines the iris recognition technique and the virtual reality technique, and develops a virtual reality device with iris acquisition function, so as to meet demands of the user on high convenience, safety and privacy when using the virtual reality device.

BRIEF DESCRIPTION OF DRAWINGS

Many aspects of the exemplary embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

FIG. 7b is a diagram illustrating calculation principle of light-emitting angle of the infrared source shown in FIG. 7a;

FIG. 8b is a diagram illustrating calculation principle of light-emitting angle of one of the two infrared sources shown in FIG. 8a.

DESCRIPTION OF EMBODIMENTS

Technical solutions in embodiments of the present disclosure will be described clearly and completely combining the accompanying drawings in the embodiments of the present disclosure. Obviously, the described embodiments are only a part of the embodiments, rather than all of them. Based on the embodiments of the present disclosure, any other embodiment obtained by those of ordinary skill in the art without creative efforts shall fall in the protection scope of the present disclosure.

Figure 1:
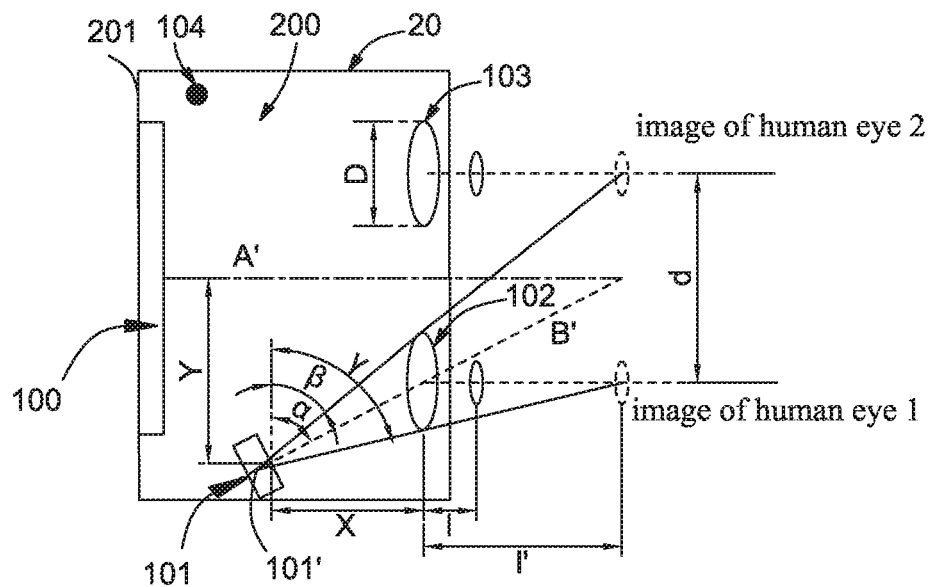
FIG. 1 is a schematic structural diagram of a virtual reality device with iris acquisition function provided by a first exemplary embodiment of the present disclosure.
Figure 2:
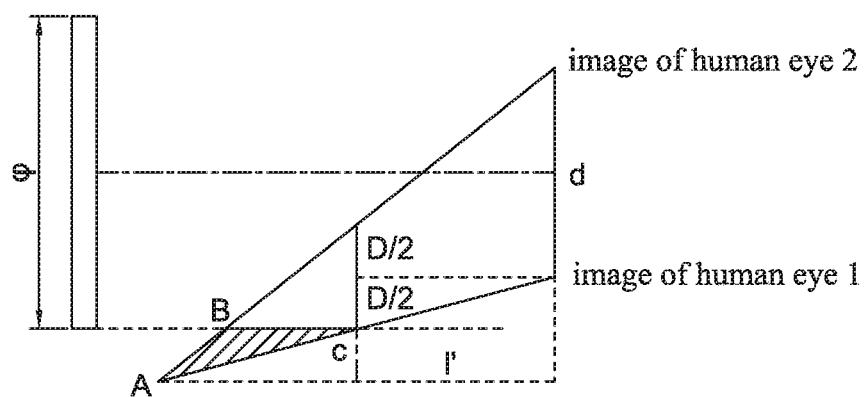
FIG. 2 is a schematic diagram illustrating a principle of the virtual reality device with iris acquisition function shown in FIG. 1.

As shown in FIG. 1 and FIG. 2, in a first exemplary embodiment, a virtual reality device with iris acquisition function includes a housing 20 having an accommodating space 200, a display screen 100 arranged on a side wall 201 of the housing 20, a first observing lens 102 and a second observing lens 103 arranged opposite to the display screen 100, an iris camera 101 and an infrared source arranged in the housing. The virtual reality device has an optical central axis A' passing through the center of the display screen 100.

The first observing lens 102 and the second observing lens 103 are respectively arranged at two sides of the optical central axis A'. The positions of the iris camera 101 and the infrared source 104 are defined as long as the display screen 100 and the line of sight when human eyes are observing the infrared source 104 will not be interfered, and are respectively arranged at two sides of the optical central axis A'. Moreover, the infrared source 104 shall be arranged on the focal plane of the first observing lens 102 and the second observing lens 103. In the present embodiment, the iris camera 101 is configured to acquire two iris images of the human eyes from the first observing lens 102 or the second observing lens 103. In order to facilitate describing the principle, taking that the iris camera 101 acquires two iris images of the human eyes from the first observing lens 102 as an example.

As shown in FIG. 1 and FIG. 2, the position of the iris camera 101 needs to satisfy a certain position relation so as not to interfere the display screen and the line of sight of the human eyes. Assuming the straight-line distance between the iris camera 101 and the first observing lens 102 is X, and the vertical distance between the iris camera 101 and the optical central axis A' is Y, the straight-line distance between the first observing lens 102 and the human eye is 1, and the straight-line distance between the first observing lens 102 and the human eye image or iris image generated through the first observing lens 102 is 1', then X and Y shall meet the following conditions:

$$Y > \frac{2d - D}{2l'} X + \frac{d - D}{2}$$

$$Y < \frac{D}{2l'} X + \frac{d + D}{2}$$

$$Y > \frac{\phi}{2}$$

In which, d in the formula is the center-to-center distance between the first observing lens 102 and the second observing lens 103, the center-to-center distance d matches with the pupil distance of the human eyes, D is the diameter of the first observing lens 102, Ø is the height of the display screen 100 in the direction perpendicular to the optical central axis A'.

The view field of the iris camera 101 shall meet the following relation:

$$\omega > 2 \times \max[(\alpha - \beta), (\gamma - \alpha)]$$

in which, ω is an view field angle, α is an angle between an optical axis B' of the iris camera 101 and a direction perpendicular to the optical central axis A', β is an angle between the direction perpendicular to the optical central axis A' and a line from one of two iris images of the human eyes to an optical center 101' of the iris camera 101, and γ is an angle between the direction perpendicular to the optical central axis A' and a line from the other one of the two iris images of the human eyes to the optical center of the iris camera 101. The optical center 101' is located in a center of the iris camera 101, and on the optical axis B' of the iris camera 101.

$$\tan \beta = \frac{X + l'}{Y + \frac{d}{2}}; \tan \gamma = \frac{X + l'}{Y - \frac{d}{2}};$$

moreover, when α−β=γ−α, the view field angle ω of the iris camera 101 shall meet the following formula:

$$\sin \omega > \frac{d(X + l')}{\sqrt{\left[(X + l')^2 + \left(Y + \frac{d}{2}\right)^2\right]\left[(X + l')^2 + \left(Y - \frac{d}{2}\right)^2\right]}}$$

and the field depth of the iris camera 101 shall further meet the following formula:

near field depth: $\Delta_1 \leq (X+l') \sin \alpha + (Y-d/2) \cos \alpha$ far field depth: $\Delta_2 \geq (X+l') \sin \alpha + (Y+d/2) \cos \alpha$ field depth: $\Delta \geq d \cdot \cos \alpha$.

The specific position of the iris camera 101 can be referred to the principle diagram shown in FIG. 2, after calculating as above, it can be seen that under the condition that the iris camera 101 can acquire two iris images of the human eyes, meanwhile not interfering the display screen 100 and the line of sight when the human eyes is observing the infrared source 104, the position of the iris camera 101 shall be placed in the shadowed triangle area ABC shown in FIG. 2.

Figure 7A:
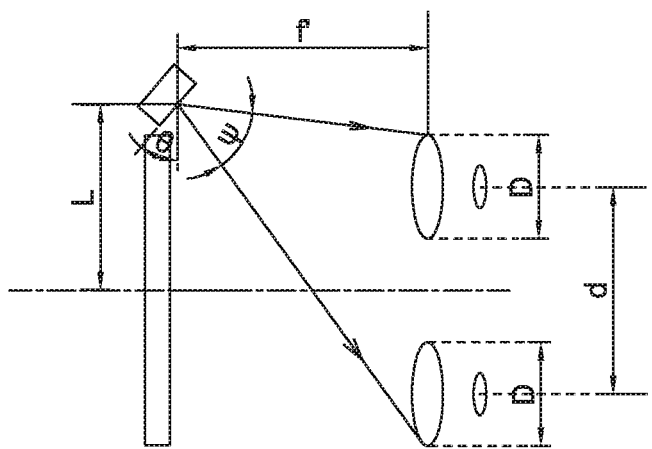
FIG. 7a is a schematic location diagram of a virtual reality device with iris acquisition function having a single infrared source provided by the present disclosure.
Figure 7B:
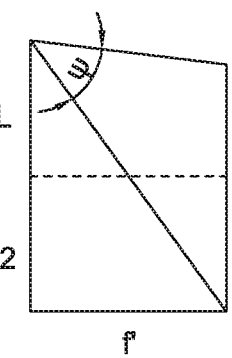

As shown in FIGS. 7a and 7b, the infrared source 104 at the other side of the optical central axis A' can lighten both human eyes at the same time, and shall be placed on the focal plane of the first observing lens 102 and the second observing lends 103, thus the light-emitting angle ψ of the infrared source 104 shall meet the following formula:

$$\sin \psi > \frac{(d+D)f'}{\sqrt{\left[f'^2 + \left(L - \frac{d+D}{2}\right)^2\right]\left[f'^2 + \left(L + \frac{d+D}{2}\right)^2\right]}}$$

in which, L is the vertical distance between the infrared source 104 and the optical central axis A', f' is a focal length of the first observing lens 102 and the second observing lens 103. The light-emitting angle ψ shall be as large as possible, on the contrary, the tilting angle θ shall be as small as possible.

Figure 3:
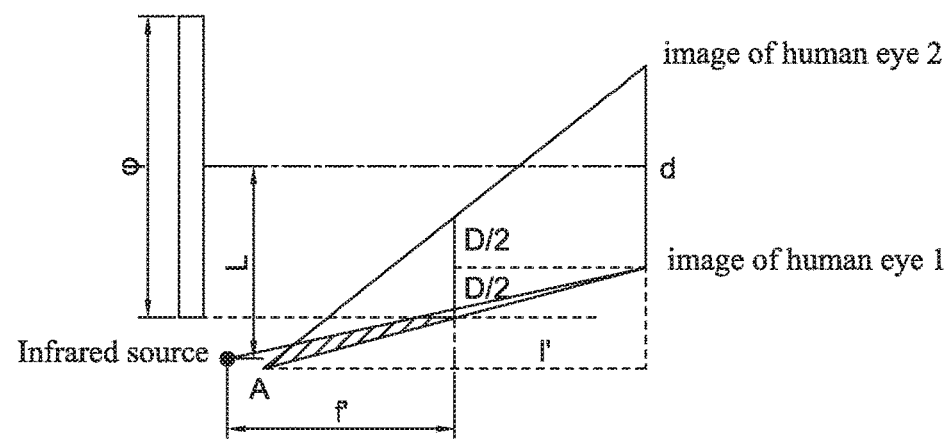
FIG. 3 is a schematic diagram briefly illustrating a principle of a virtual reality device with iris acquisition function according to a second exemplary embodiment of the present disclosure.

As shown in FIG. 3, in a second exemplary embodiment, the structure of this embodiment is the same as that of the first exemplary embodiment, the difference lies in that, the present embodiment provides another placement of the infrared source, that is, the infrared source is placed on the same side with the iris camera. At this time, the iris camera shall meet the position relation:

$$Y > \frac{2d - D}{2l'} X + \frac{d - D}{2}$$

$$Y < \frac{D}{2l'} X + \frac{d + D}{2}$$

$$Y > \frac{\phi}{2}$$

$$Y > \frac{2L - d}{2(f' + l')} X + \frac{d}{2} + \left(\frac{(2L - d)}{2(f' + l')}\right) l'$$

in which, L is the vertical distance between the infrared source and the optical central axis, X is the straight-line distance between the iris camera and the first observing lens, Y is the vertical distance between the iris camera and the optical central axis, l is the straight-line distance between the first observing lens and the human eye, l' is the straight-line distance between the first observing lens and the human eye image or iris image generated through the first observing lens, d is the center-to-center distance between the first observing lens and the second observing lens, the center-to-center distance d matches with the pupil distance of the human eyes, D is the diameter of the first observing lens, Ø is the height of the display screen in the direction perpendicular to the optical central axis.

Similar with the first exemplary embodiment, the view field angle ω of the iris camera shall meet the following formula:

$$\omega > 2 \times \max[(\alpha-\beta),(\gamma-\alpha)]$$

in which, $$\tan\beta = \frac{X+l'}{Y+\frac{d}{2}}; \tan\gamma = \frac{X+l'}{Y-\frac{d}{2}};$$

when $\alpha-\beta=\gamma-\alpha$, the view field angle $\omega$ of the iris camera shall meet the following formula:

$$\sin\omega > \frac{d(X+l')}{\sqrt{\left[(X+l')^2+\left(Y+\frac{d}{2}\right)^2\right]\left[(X+l')^2+\left(Y-\frac{d}{2}\right)^2\right]}}$$

and the field depth of the iris camera shall further meet the following formula:

near field depth: $\Delta_1 \leq (X+l')\sin\alpha + (Y-d/2)\cos\alpha$ far field depth: $\Delta_2 \geq (X+l')\sin\alpha + (Y+d/2)\cos\alpha$ field depth: $\Delta \geq d \cdot \cos\alpha$ The specific position of the iris camera can be referred to the principle diagram shown in FIG. 3, after calculating as above, it can be seen that under the condition that the iris camera can acquire two iris images of the human eyes, meanwhile not interfering the display screen and the line of sight when the human eyes is observing the infrared source, the position of the iris camera shall be placed in the shadowed area shown in FIG. 3.

Meanwhile, the light-emitting angle $\psi$ of the infrared source shall meet the following formula:

$$\sin\psi > \frac{(d+D)f'}{\sqrt{\left[f'^2+\left(L-\frac{d+D}{2}\right)^2\right]\left[f'^2+\left(L+\frac{d+D}{2}\right)^2\right]}}$$

in which, f' is the focal length of the first observing lens and the second observing length. The light-emitting angle $\psi$ shall be as large as possible, on the contrary, the tilting angle $\theta$ shall be as small as possible.

Figure 4:
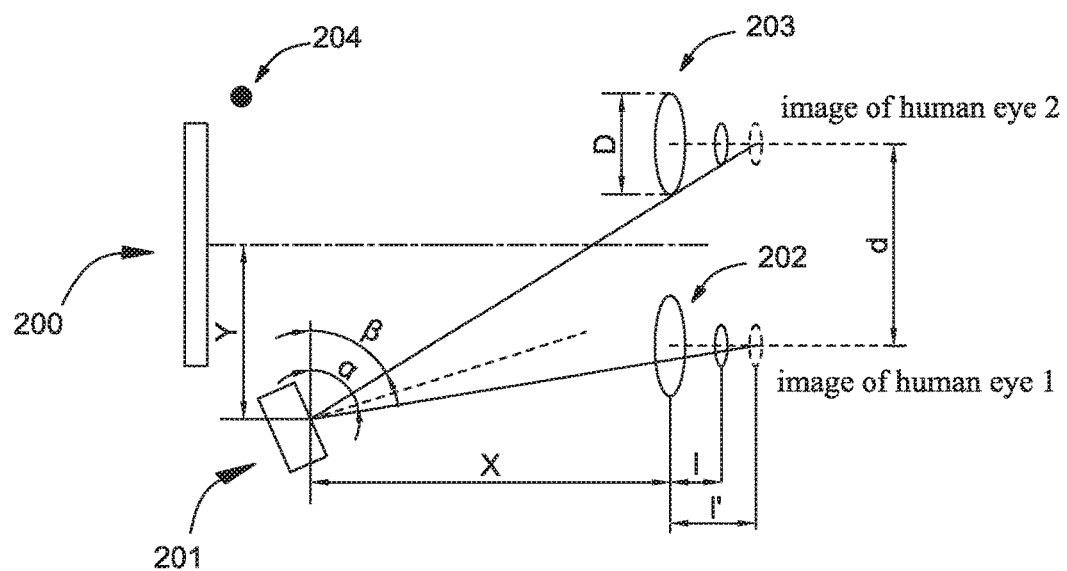
FIG. 4 is a schematic structural diagram of a virtual reality device with iris acquisition function provided by a second exemplary embodiment of the present disclosure.

As shown in FIG. 4, in a third exemplary embodiment, the structure is substantially the same as that of the first exemplary embodiment, the difference lies in that, the iris camera 201 in the present embodiment acquires iris images of both eyes respectively from the first observing lens 202 and the second observing lens 203. In the present embodiment, the iris camera 201 and the infrared source 204 are placed at two sides of the optical central axis.

Assuming the straight-line distance between the iris camera 201 and the first observing lens 202 or the second observing lens 203 is X, and the vertical distance between the iris camera 201 and the optical central axis is Y, the straight-line distance between the first observing lens 202 or the second observing lens 203 and the human eye is l, and the straight-line distance between the first observing lens 202 and the human eye image or iris image generated through the first observing lens 202 is l', then X and Y shall meet the following formula:

$$Y > \frac{\phi+D}{2(H+l')}X - l' + \frac{\phi+D}{4(H+l')}d$$

$$Y < \frac{D}{2l'}X - \frac{d-D}{2}$$

$$Y > \frac{\phi}{2}$$

In which, H is the straight-line distance between the display screen 200 and the first observing lens 202 or the second observing lens 203, d is the center-to-center distance between the first observing lens 202 and the second observing lens 203 which matches with the pupil distance of the human eyes, D is the diameter of the first observing lens 202 and the second observing lens 203, 0 is the height of the display screen 200 in the direction perpendicular to the optical central axis.

The view field of the iris camera 201 shall meet the following relation:

$$\omega > 2 \times \max[(\alpha-\beta),(\gamma-\alpha)]$$

in which, $$\tan\beta = \frac{X+l'}{Y+\frac{d}{2}}; \tan\gamma = \frac{X+l'}{Y-\frac{d}{2}};$$

Moreover, when $\alpha-\beta=\gamma-\alpha$, the view field angle $\omega$ of the iris camera 201 shall meet the following formula:

$$\sin\omega > \frac{d(X+l')}{\sqrt{\left[(X+l')^2+\left(Y+\frac{d}{2}\right)^2\right]\left[(X+l')^2+\left(Y-\frac{d}{2}\right)^2\right]}}$$

and the field depth of the iris camera 201 shall further meet the following formula:

near field depth: $\Delta_1 \leq (X+l')\sin\alpha + (Y-d/2)\cos\alpha$ far field depth: $\Delta_2 \geq (X+l')\sin\alpha + (Y\ d/2)\cos\alpha$ field depth: $\Delta \geq d \cdot \cos\alpha$.

Figure 5:
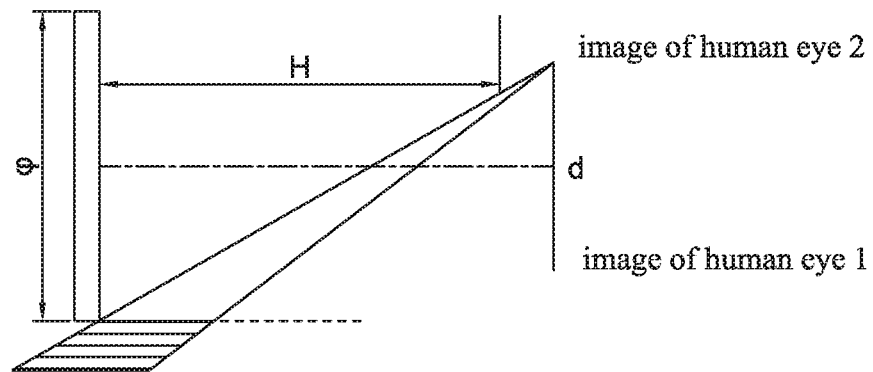
FIG. 5 is a schematic diagram illustrating a principle of the virtual reality device with iris acquisition function shown in FIG. 4.

The specific position of the iris camera 201 can be referred to the principle diagram shown in FIG. 5, after calculating as above, it can be seen that under the condition that the iris camera 201 can acquire two iris images of the human eyes, meanwhile not interfering the display screen 200 and the line of sight when the human eyes is observing the infrared source 204, the position of the iris camera 201 shall be placed in the shadowed area shown in FIG. 5.

Referring to FIG. 7a and FIG. 7b, the light-emitting angle $\psi$ of the infrared source shall meet the following formula:

$$\sin\psi > \frac{(d+D)f'}{\sqrt{\left[f'^2+\left(L-\frac{d+D}{2}\right)^2\right]\left[f'^2+\left(L+\frac{d+D}{2}\right)^2\right]}}$$

in which, L is the vertical distance between the infrared source 204 and the optical central axis, f' is a focal length of the first observing lens 202 and the second observing lens 203. The light-emitting angle ψ shall be as large as possible, on the contrary, the tilting angle θ shall be as small as possible.

Figure 6:
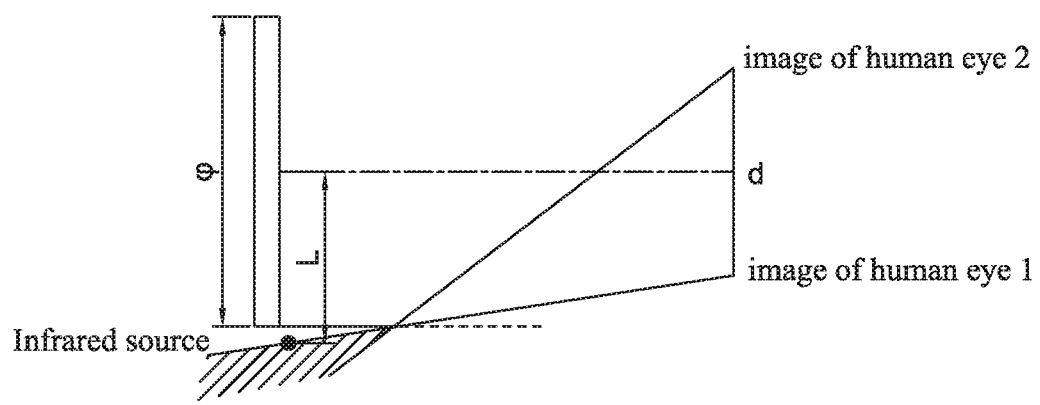
FIG. 6 is a schematic location diagram when an infrared source and an iris camera are located at a same side of a central axis in the virtual reality device with iris acquisition function shown in FIG. 4.

As shown in FIG. 6, in a fourth exemplary embodiment, the structure of the present embodiment is the same as that of the previous embodiment, the difference lies in that, the present embodiment provides another placement of the infrared source, that is, the infrared source is placed on the same side with the iris camera. At this time, the iris camera shall meet the position relation:

$$Y > \frac{2L-D}{2(f'+l')}X + \frac{d}{2} + \frac{(2L-D)}{2(f'+l')}l'$$

$$Y < \frac{D}{2l'}X - \frac{d-D}{2}$$

$$Y > \frac{\emptyset}{2}$$

in which, L is the vertical distance between the infrared source and the optical central axis, X is the straight-line distance between the iris camera and the first observing lens, Y is the vertical distance between the iris camera and the optical central axis, l is the straight-line distance between the first observing lens and the human eye, l' is the straight-line distance between the first observing lens and the human eye image or iris image generated through the first observing lens, d is the center-to-center distance between the first observing lens and the second observing lens, the center-to-center distance d matches with the pupil distance of the human eyes, D is the diameter of the first observing lens, Ø is the height of the display screen in the direction perpendicular to the optical central axis.

Similar with the first exemplary embodiment, the view field angle ω of the iris camera shall meet the following formula:

$$\omega > 2 \times \max[(\alpha - \beta), (\gamma - \alpha)]$$

in which $$\tan\beta = \frac{X + l'}{Y + \frac{d}{2}};$$

$$\tan\gamma = \frac{X + l'}{Y - \frac{d}{2}};$$

when $\alpha - \beta = \gamma - \alpha$, the view field angle ω of the iris camera shall meet the following formula:

$$\sin\omega > \frac{d(X + l')}{\sqrt{\left[(X + l')^2 + \left(Y + \frac{d}{2}\right)^2\right]\left[(X + l')^2 + \left(Y - \frac{d}{2}\right)^2\right]}}$$

and the field depth of the iris camera shall further meet the following formula:

near field depth: $\Delta_1 \leq (X+l')\sin\alpha + (Y-d/2)\cos\alpha$ far field depth: $\Delta_2 \geq (X+l')\sin\alpha + (Y+d/2)\cos\alpha$ field depth: $\Delta \geq d \cdot \cos\alpha$.

The specific position of the iris camera can be referred to the principle diagram shown in FIG. 6, after calculating as above, it can be seen that under the condition that the iris camera can acquire two iris images of the human eyes, meanwhile not interfering the display screen and the line of sight when the human eyes is observing the infrared source, the position of the iris camera shall be placed in the shadowed area shown in FIG. 6.

The light-emitting angle ψ of the infrared source shall meet the following formula:

$$\sin\psi > \frac{(d+D)f'}{\sqrt{\left[f'^2 + \left(L - \frac{d+D}{2}\right)^2\right]\left[f'^2 + \left(L + \frac{d+D}{2}\right)^2\right]}}$$

in which, L is the vertical distance between the infrared source and the optical central axis, f' is a focal length of the first observing lens and the second observing lens. The light-emitting angle ψ shall be as large as possible, on the contrary, the tilting angle θ shall be as small as possible.

Figure 8A:
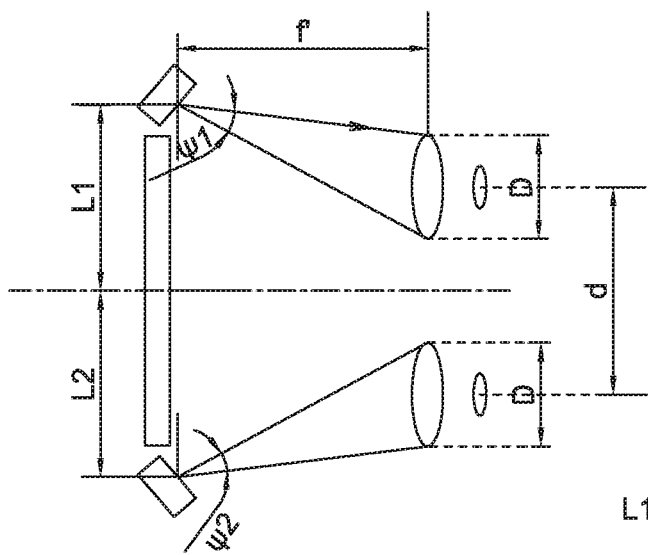
FIG. 8a is a schematic location diagram of a virtual reality device with iris acquisition function having two infrared sources provided by the present disclosure.
Figure 8B:
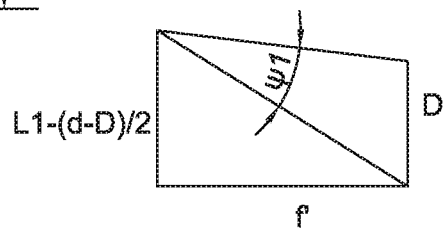

In the above embodiments, the virtual reality device with iris acquisition function can further include two infrared sources, as shown in FIG. 8a and FIG. 8b, the vertical distances between the two infrared sources and the optical central axis are respectively $L_1$ and $L_2$, the light-emitting angles are respectively $\psi_1$ and $\psi_2$, then the light-emitting angles shall respectively meet the following formula:

$$\sin\psi_1 > \frac{D \times f'}{\sqrt{\left[f'^2 + \left(L1 - \frac{d+D}{2}\right)^2\right]\left[f'^2 + \left(L1 - \frac{d-D}{2}\right)^2\right]}}$$

$$\sin\psi_2 > \frac{D \times f'}{\sqrt{\left[f'^2 + \left(L2 - \frac{d+D}{2}\right)^2\right]\left[f'^2 + \left(L2 - \frac{d-D}{2}\right)^2\right]}}$$

In other possible embodiments, the virtual reality device with iris acquisition function can further include two iris cameras, which are arranged adjacent to the display screen and are respectively at two sides of the optical central axis, configured to acquire a single iris image of the human eyes respectively from the two observing lenses. The position relation that the iris cameras shall meet can be referred to the above embodiments. Similarly, the number of the infrared source can be one or two, the condition that the light-emitting angle shall meet can also be referred to the above embodiments.

The above are preferred embodiments of the present disclosure, which are not intended to limit the present disclosure, for person skilled in the art, the present disclosure can have various alternations and modifications. Any modification, equivalent replacement and improvement made within the spirit and principle of the present disclosure shall fall into the protection scope of the present disclosure.

What is claimed is:

1. A virtual reality device with iris acquisition function, comprising:
a housing having an accommodating space;
an observing lens embedded in the housing;
a display screen accommodated in the housing and arranged opposite to the observing lens; and
at least one iris camera accommodated in the housing;

the virtual reality device comprising an optical central axis passing through a center of the display screen;

wherein the virtual reality device further comprises:

at least one infrared source accommodated in the housing, the infrared source is arranged on a focal plane of the observing lens and light emitted from the infrared source passes through the observing lens to an iris of a human eye, the iris camera is configured to acquire an iris image of the human eye through the observing lens and the iris camera is arranged at a position which will not interfere a line of sight of the human eye on the infrared source and the display screen; and a straight-line distance between the iris camera and the observing lens is X, a vertical distance between the iris camera and the central axis is Y, a straight-line distance between the observing lens and an image of the human eye generated through the observing lens is l', X and Y meet following formula:

$$Y > \frac{2d-d}{2l'}X + \frac{d-D}{2}$$

$$Y < \frac{D}{2l'}X + \frac{d+D}{2}$$

$$Y > \frac{\emptyset}{2}$$

in which, d is a pupil distance of human eyes, D is a diameter of the observing lens, Ø is a height of the display screen in a direction perpendicular to the central axis.

2. The virtual reality device with iris acquisition function as described in claim 1, wherein, two observing lens are provided, which respectively are a first observing lens and a second observing lens, the iris camera is configured to acquire two iris images of human eyes through the first observing lens or the second observing lens.

3. The virtual reality device with iris acquisition function as described in claim 2, wherein, the iris camera and the infrared source are respectively arranged at two sides of the central axis.

4. The virtual reality device with iris acquisition function as described in claim 2, wherein, the iris camera and the infrared source are respectively arranged at a same side of the central axis.

5. The virtual reality device with iris acquisition function as described in claim 2, wherein, X and Y meet following formula:

$$Y > \frac{2L-d}{2(f'+l')}X + \frac{d}{2} + \frac{(2L-d)}{2(f'+l')}l'$$

in which, L is a vertical distance between the infrared source and the optical central axis.

6. The virtual reality device with iris acquisition function as described in claim 3, wherein, a view field angle ω of the iris camera meets following formula:

ω>2×max[(α−β),(γ−α)]

in which, α is an angle between an optical axis of the iris camera and a direction perpendicular to the optical central axis, β is an angle between the direction perpendicular to the optical central axis and a line from one of two iris images of the human eyes to an optical center of the iris camera, and γ is an angle between the direction perpendicular to the optical central axis and a line from the other one of the two iris images of the human eyes to the optical center of the iris camera, $$\tan\beta = \frac{X+l'}{Y+\frac{d}{2}}; \tan\gamma = \frac{X+l'}{Y-\frac{d}{2}};$$

when α−β=γ−α, the view field angle ω of the iris camera shall meet following formula:

$$\sin\omega > \frac{d(X+l')}{\sqrt{\left[(X+l')^2+\left(Y+\frac{d}{2}\right)^2\right]\left[(X+l')^2+\left(Y-\frac{d}{2}\right)^2\right]}}.$$

7. The virtual reality device with iris acquisition function as described in claim 5, wherein, a view field angle ω of the iris camera meets following formula:

ω>2×max[(α−β),(γ−α)]

in which, α is an angle between an optical axis of the iris camera and a direction perpendicular to the optical central axis, β is an angle between the direction perpendicular to the optical central axis and a line from one of two iris images of the human eyes to an optical center of the iris camera, and γ is an angle between the direction perpendicular to the optical central axis and a line from the other one of the two iris images of the human eyes to the optical center of the iris camera, $$\tan\beta = \frac{X+l'}{Y+\frac{d}{2}}; \tan\gamma = \frac{X+l'}{Y-\frac{d}{2}};$$

when α−β=γ−α, the view field angle ω of the iris camera shall meet following formula:

$$\sin\omega > \frac{d(X+l')}{\sqrt{\left[(X+l')^2+\left(Y+\frac{d}{2}\right)^2\right]\left[(X+l')^2+\left(Y-\frac{d}{2}\right)^2\right]}}.$$

8. The virtual reality device with iris acquisition function as described in claim 6, wherein, a single infrared source is provided, a vertical distance between the infrared source and the central axis is L, a light-emitting angle is ω, the light-emitting ψ meets following formula:

$$\sin\psi > \frac{(d+D)f'}{\sqrt{\left[f'^2+\left(L-\frac{d+D}{2}\right)^2\right]\left[f'^2+\left(L+\frac{d+D}{2}\right)^2\right]}}$$

in which, f' is a focal length of the first observing lens and the second observing lens.

9. The virtual reality device with iris acquisition function as described in claim 6, wherein, two infrared sources are provided, vertical distances between the infrared sources and the central axis are respectively $L_1$ and $L_2$, light-emitting angles are respectively $\psi_1$ and $\psi_2$, the light-emitting $\psi_1$ and $\psi_2$ respectively meet following formula:

$$\sin\psi_1 > \frac{D \times f'}{\sqrt{\left[f'^2 + \left(L1 - \frac{d+D}{2}\right)^2\right]\left[f'^2 + \left(L1 - \frac{d-D}{2}\right)^2\right]}}$$

$$\sin\psi_2 > \frac{D \times f'}{\sqrt{\left[f'^2 + \left(L2 - \frac{d+D}{2}\right)^2\right]\left[f'^2 + \left(L2 - \frac{d-D}{2}\right)^2\right]}}$$

in which, f' is a focal length of the first observing lens and the second observing lens.

10. The virtual reality device with iris acquisition function as described in claim 6, wherein, a calculation formula of a field depth of the iris camera is:

near field depth: $\Delta_1 \leq (X+l')\sin\alpha + (Y-d/2)\cos\alpha$ far field depth: $\Delta_2 \geq (X+l')\sin\alpha + (Y+d/2)\cos\alpha$ field depth: $\Delta \geq d \cdot \cos\alpha$.

11. The virtual reality device with iris acquisition function as described in claim 1, wherein, the virtual reality device comprises an optical central axis passing through a center of the display screen, two iris cameras are provided, the iris cameras are arranged adjacent to the display screen and are respectively at two sides of the optical central axis; two observing lenses are provided, the observing lenses are arranged opposite to the display screen and are respectively at two sides of the central axis, the two iris cameras are configured to acquire a single iris image of the human eye respectively from the two observing lenses.

\* \* \* \* \*